United States Patent
Yoshida et al.

(10) Patent No.: US 6,466,562 B1
(45) Date of Patent: *Oct. 15, 2002

(54) DATA COMMUNICATION DEVICES, PERSONAL HANDY-PHONE SYSTEM BASE STATIONS, AND METHODS OF COMMUNICATING DATA

(75) Inventors: Satoshi Yoshida, Nice; Patrick Feyfant, Toulon; Phillippe Gaglione, Mandelieu; Denis Archambaud, Antibes; Varenka Martin, Antibes; Laurent Winckel, Antibes; Rita Lagomarsino, Antibes; Oliver Weigelt, Antibes, all of (FR)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,266

(22) Filed: Dec. 29, 1997

(51) Int. Cl.[7] .............................. H04J 3/22; H04Q 7/20
(52) U.S. Cl. ................ 370/336; 370/345; 370/466; 370/468; 370/476; 370/538
(58) Field of Search ................ 370/329, 336, 370/337, 345, 347, 401, 465, 466, 468, 476, 535, 537, 538, 477

(56) References Cited

U.S. PATENT DOCUMENTS 4,864,562 A * 9/1989 Murakami et al. ........... 370/538
5,369,636 A * 11/1994 Ueno et al. ................. 370/538
5,519,702 A * 5/1996 Takahashi ................... 370/468

(List continued on next page.)

FOREIGN PATENT DOCUMENTS

JP          8046565          2/1996

OTHER PUBLICATIONS

Cordless in the Local Loop, by Margareta Zanichelli, from *Cordless Telecommunications Worldwide*, Walter H.W. Tuttlebee, pp. 71–87.

(List continued on next page.)

*Primary Examiner*—Min Jung
(74) *Attorney, Agent, or Firm*—Peter Zawitski (57) ABSTRACT

The present invention provides data communication devices, personal handy-phone system base stations, and methods of communicating data. One embodiment of the present invention provides a data communication device including: a transceiver operable to receive wireless signals and recover a baseband signal containing a plurality of first slots from the received wireless signals; a multiple access processor coupled with the transceiver, the multiple access processor being operable to extract data from the first slots and communicate data at a first information transfer rate; a data formatter operable to combine data from plural first slots to form a second slot, the data formatter further being operable to output the second slot at a second information transfer rate; and an interface coupled with the data formatter, the interface being configured for connection with a network and operable to communicate the second slot. Another embodiment of the present invention provides a method of communicating data including: forming a plurality of first slots containing data to be communicated; communicating the first slots including transmitting wireless signals and receiving the wireless signals; extracting the data from the wireless signals at a first information transfer rate following the receiving; combining data from plural first slots following the extracting; forming a second slot using the combined data; and outputting the second slot at a second information transfer rate.

54 Claims, 8 Drawing Sheets

U.S. PATENT DOCUMENTS

| | | | |
|---|---|---|---|
| 5,555,258 A | | 9/1996 | Snelling et al. ............... 370/29 |
| 5,586,122 A | | 12/1996 | Suzuki et al. ............... 370/347 |
| 5,602,837 A | | 2/1997 | Takahashi ................... 370/280 |
| 5,636,243 A | | 6/1997 | Tanaka ....................... 375/219 |
| 5,987,017 A | * | 11/1999 | Lee ............................ 370/336 |
| 6,018,532 A | * | 1/2000 | Nilsson et al. .............. 370/535 |
| 6,044,082 A | * | 3/2000 | Nygard et al. .............. 370/437 |
| 6,115,367 A | * | 9/2000 | Archambaud et al. ...... 370/334 |
| 6,160,823 A | * | 12/2000 | Saintot ....................... 370/538 |

OTHER PUBLICATIONS

The PHS Standard, by Yuichiro Takagawa, from *Cordless Telecommunications Worldwide*, Walter H.W. Tuttlebee, pp. 429–438.

*Personal Handy–Phone System (PHS) Guidebook*, Ministry of Posts & Telecommunications, Japan.

PHS RCR STD–28, Chapter 1, General; Issued Dec. 20, 1993.

* cited by examiner

DATA COMMUNICATION DEVICES, PERSONAL HANDY-PHONE SYSTEM BASE STATIONS, AND METHODS OF COMMUNICATING DATA

TECHNICAL FIELD

The present invention relates to data communication devices, personal handy-phone system base stations, and methods of communicating data.

BACKGROUND OF THE INVENTION

The benefits of a wireless communication network are readily recognized. The ability to transmit and receive either voice or peripheral (i.e., facsimile) messages in mobile environments has been utilized in numerous applications.

Wireless communications systems including cellular systems have enjoyed increasing popularity. Cellular systems generally comprise a base station and a plurality of portable stations. Cellular systems offer a radius of approximately 1–15 km per base station, and traditionally provide coverage for cities, railways and main roads. Existing cellular systems typically utilize a service network which is distinct from the existing traditional telecommunications network.

Other wireless communication protocols have been introduced to provide benefits over existing cellular wireless technologies. Such communication protocols provide benefits of interfacing directly with and utilizing the existing telecommunication network. Such direct interfacing capabilities eliminate the need for a distinct switching system.

One such communication system is the personal handy-phone system (PHS). The personal handy-phone system is a digital cordless telephone system that offers integrated telecommunication services, such as voice and data, via a universal radio interface. The personal handy-phone system offers digitalization of the communication system. In particular, the digital personal handy-phone system offers improved quality and effective use of frequencies. The personal handy-phone system also offers flexible interconnectability wherein connection of a personal station with a plurality base stations at various locations such as the office, home, or outdoors is possible. The PHS standard is set forth by the Telecommunications Technical Committee of Japan in "Personal Handy-Phone System", Japanese Telecommunications System Standard, RCR-STD 28.

The personal handy-phone system also offers connectability with existing communications networks. Connection is possible with analog telephone networks as well as digital networks, such as an Integrated Services Digital Network (ISDN) communication platform.

Personal handy-phone systems typically comprise a plurality of personal or portable stations (PS), also referred to as handsets, and base stations, also referred to as cell stations (CS). Personal handy-phone systems are designed to provide wireless multimedia communications, terminal mobility, and complete two way communications. Personal handy-phone systems utilize a micro-cell structure. Personal stations and base stations of the personal handy-phone system are configured to transmit and receive data via a plurality of data packets, also referred to as PHS slots.

Data may be transmitted in a PHS system at either a half rate or a full rate according to the PHS standard. Half rate communications provide digital communications at a bit rate of 16 kbps (kilo bits per second), while full rate communications provide digital communications at an increased bit rate of 32 kbps.

The base stations of the wireless system are coupled with the telecommunication networks in typical configurations. Integrated Services Digital Networks present bearer channels, also referred to as B channels, and a delta channel, typically referred to as a D channel. ISDN basic access provides two bearer channels and a single delta channel and may be implemented along a traditional twisted pair of copper cable. ISDN primary access provides thirty bearer channels and a single delta channel and may be implemented along a single coaxial or fiber optic cable.

The bearer channels provide transmission of user data between interfaces at a bit rate of 64 kbps without altering the transmitted data. The delta channel provides transmission of packetized signalling or control information, such as dial up information, between a user and a local exchange at a bit rate of 16 kbps. Despite the increased transmission capabilities of existing telecommunication networks, some standards, including PHS, provide for the insertion of "dummy" data to provide communications at increased rates. For example, in PHS, four dummy bits are added to four bits of full rate PHS data to provide the PHS data at a bit rate of 64 kbps. Alternatively, six dummy bits are added to two bits of half rate PHS data. Currently, the dummy bits do not communicate useful information.

In light of the above, there exists a need to provide improved interfacing between wireless communication systems and associated communication platforms to provide full utilization of the transmission capabilities of the platforms and maximum data transfer.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A first aspect of the present invention provides a personal handy-phone system base station comprising: a transceiver operable to receive radio frequency signals and recover plural baseband signals containing data within plural PHS slots; a time division multiple access processor operable to extract data from the PHS slots and communicate extracted data at a first information transfer rate; a data formatter operable to form an ISDN B channel slot using extracted data from plural PHS slots; and an interface configured to communicate the ISDN B channel slot to an Integrated Services Digital Network at a second information transfer rate.

According to another aspect of the present invention, a data communication device comprises: a transceiver operable to receive wireless signals and recover a baseband signal containing a plurality of first slots from the received wireless signals; a multiple access processor coupled with the transceiver, the multiple access processor being operable to extract data from the first slots and communicate data at a first information transfer rate; a data formatter operable to combine data from plural first slots to form a second slot, the data formatter further being operable to output the second slot at a second information transfer rate; and an interface coupled with the data formatter, the interface being configured for connection with a network and operable to communicate the second slot.

Another aspect of the present invention provides a method of communicating data comprising: forming a plurality of first slots containing data to be communicated; communicating the first slots including transmitting wireless signals and receiving the wireless signals; extracting the data from the wireless signals at a first information transfer rate following the receiving; combining data from plural first slots following the extracting; forming a second slot using the combined data; and outputting the second slot at a second information transfer rate.

A next aspect of the present invention provides a method of communicating data comprising: communicating data through a receive path including: receiving data at a first information transfer rate; combining the data; and outputting the combined data at a second information transfer rate; and communicating data through a transmit path including: receiving data at the second information transfer rate; separating the data; and outputting the separated data at the first information transfer rate.

According to another aspect, the present invention provides a method of communicating data comprising: providing data in a plurality of first slots; communicating the first slots; extracting data from the first slots; combining data extracted from the first slots; forming a second slot using combined data from the first slots; and communicating the second slot.

Yet another aspect of the present invention provides a method of communicating data comprising: providing a plurality of first channels; providing a second channel; first communicating plural data signals via respective ones of the first channels; combining data from the plural data signals following the first communicating; second communicating combined data using the second channel; separating combined data; and third communicating separated data using the first channels.

In accordance with another aspect, the present invention provides a personal handy-phone system base station comprising: a transceiver operable to receive radio frequency signals from plural personal stations, the radio frequency signals from respective personal stations containing a plurality of PHS slots individually having data therein, the transceiver further operable to recover baseband signals from the received radio frequency signals, the baseband signals containing the PHS slots; a time division multiple access processor operable to extract data from the PHS slots and output the extracted data at a first information transfer rate of 32 kbps; a multiport random access memory device electrically coupled with the time division multiple access processor, the memory device being configured to store the extracted data; a data formatter electrically coupled with the multiport random access memory device, the data formatter being configured to retrieve data from the memory device and combine data from plural PHS slots to form individual ISDN B channel slots, the data formatter being further configured to output the ISDN B channel slots at a second information transfer rate of 64 kbps; and an interface configured to output the ISDN B channel slots to an Integrated Services Digital Network responsive to timing signals provided from the Integrated Services Digital Network.

Figure 1:
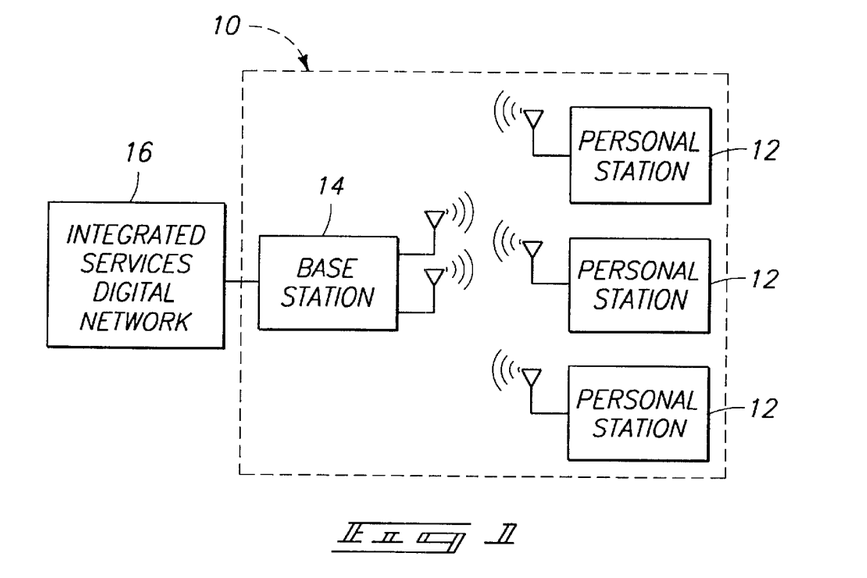
FIG. 1 is a functional block diagram of a PHS wireless communication system interfaced with an Integrated Services Digital Network.

Referring to FIG. 1, a communication system is shown. In the illustrated embodiment, communication system comprises a personal handy-phone system (PHS) 10. This disclosure of a personal handy-phone system is illustrative and exemplary, and the present invention may be utilized with other communication protocols.

The illustrated personal handy-phone system 10 includes a base station 14 and a plurality of personal stations 12. Plural communication channels are provided intermediate the personal stations 12 and base station 14. One such communication channel provides bi-directional communications between one personal station 12 and base station 14.

Base station 14 is typically coupled with an associated telecommunication system such as an Integrated Services Digital Network (ISDN) 16. A given cell may contain plural base stations 14 depending upon the traffic volume to be handled. In an alternative embodiment, a master base station and plurality of slave base stations are provided for such increased transmission capabilities. FIG. 1 shows but one of such base stations.

The personal handy-phone system is configured to allow movement of the personal stations 12 throughout a cell during radio frequency communications with a respective base station 14. Base stations 14 are configured to handover communications with a corresponding personal station 12 to an adjacent base station 14 responsive to the movement of the personal station 12. Personal stations 12 are also configured provide mobile radio communications directly to other personal stations 12. The illustrated base station 14 includes an antenna configuration comprising dual antennas for providing antenna diversity and improved spectral efficiency. Personal stations 12 include respective antenna configurations for providing radio frequency communications.

The radio interfaces of the base station 14 and personal stations 12 individually have four-channel time division multiple access capability with time division duplexing (4-channel TDMA-TDD). At least one embodiment of this communication protocol provides one control channel and three traffic channels for an individual base 8 station 14. Further, base station 14 is configured to communicate at a plurality of rates in the described embodiment. A single base station 14 may communicate with four personal stations at full rate and eight personal stations at half rate. Providing time division multiple access capability with time division duplexing avoids the need for paired frequency bands.

Figure 2:
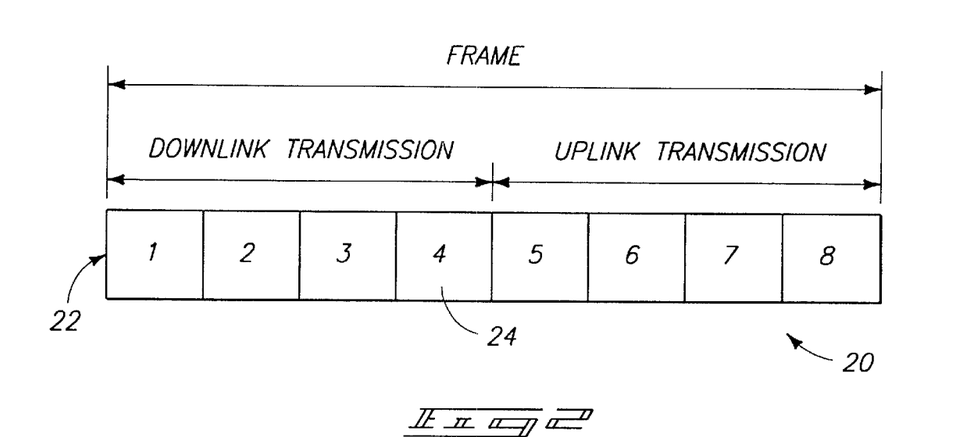
FIG. 2 is a diagrammatic representation of a frame in accordance with the PHS communications protocol.

Referring to FIG. 2, a typical radio channel structure 20 according to the personal handy-phone system standard is shown. The radio channel structure comprises a frame 22 which includes a plurality of first slots 24. Slots 24 are also referred to as PHS slots (eight PHS slots are shown defining one frame in FIG. 2). In particular, one five millisecond TDMA-TDD frame within the radio channel structure 20 includes four PHS slots for base station transmission, and four PHS slots for personal station transmission. Communications from base station 14 to respective personal stations 12, referred to herein as downlink communications, occur within the first four PHS slots 24 of the frame 22 (i.e., slots 1–4). Communications from respective personal stations 12 to the base station 14, referred to herein as uplink communications, occur within the subsequent four PHS slots of the illustrated frame 22 (i.e., slots 5–8).

The personal handy-phone system communications protocol provides for a control channel (CCH) and a communication channel, also referred to as a traffic channel (TCH). The control channel (CCH) may be one of a variety of formats in accordance with the personal handy-phone system standard. The control channel is composed of a combination of a common control channel (CCCH) and an associated control channel (ACCH) in one embodiment. The common control channel and associated control channel make up a single dedicated channel providing improved performance in conditions of intermittent communications. The communication or traffic channel is utilized to transmit user traffic information. A guard field comprising a predetermined number of guard bits is typically provided intermediate adjacent PHS slots 24.

The communication channel may provide for user defined transmissions within first and second user packet channels (also referred to as UPCH1 and UPCH2). More specifically, the user packet channels are utilized to transmit control signal information as well as user packet data. The PHS slot format provides burst data communications. Voice data or peripheral (e.g., facsimile) data is provided within user defined fields of the user packet channels described below.

Figure 3:
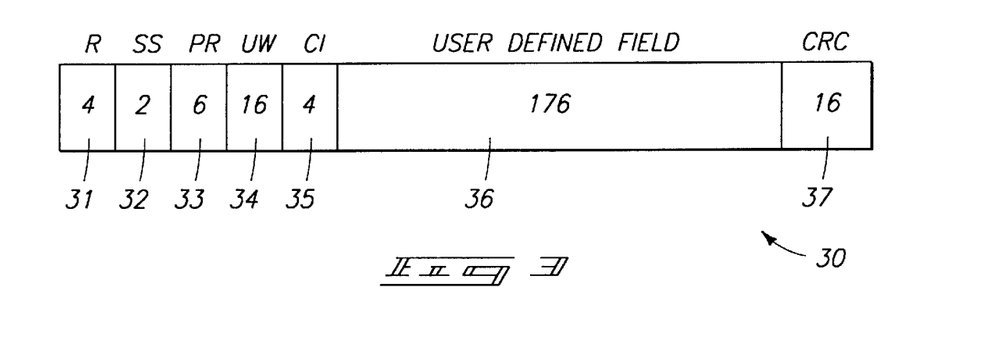
FIG. 3 is a diagrammatic representation of a first user packet channel slot in accordance with the PHS communications protocol.
Figure 4:
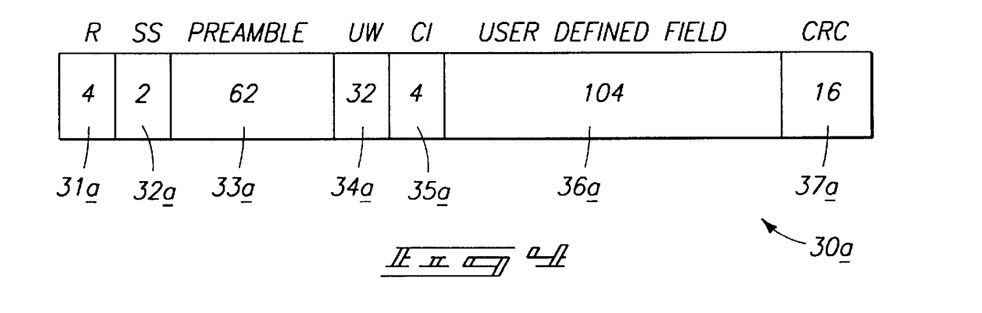
FIG. 4 is a diagrammatic representation of a second user packet channel slot according to the PHS communications protocol.

Referring to FIG. 3 and FIG. 4, two exemplary PHS slots are shown. FIG. 3 illustrates a first user packet channel (i.e., UPCH1) PHS slot 30 and FIG. 4 illustrates a second user packet channel (i.e., UPCH2) PHS slot 30a. PHS slot 30 comprises a ramp field (R) 31 of four bits, start symbol field (SS) 32 of two bits, a preamble 33 of sixty-two bits, a unique word (UW) 34 of sixteen bits, and a channel identifier field (CI) 35 of four bits. A user defined field 36 of 176 bits and a cyclic redundancy check field (CRC) 37 of sixteen bits are provided after the channel identifier 35.

Referring to FIG. 4, PHS slot 30a comprises a ramp field (R) 31a of four bits and a start symbol field (SS) 32a of two bits. UPCH2 slot 30a additionally comprises a preamble 33a of sixty-two bits, unique word (UW) 34a of thirty-two bits, and a channel identifier field (CI) 35a of four bits. A user defined field 36a of 104 bits and a cyclic redundancy check field (CRC) 37a of sixteen bits are provided after the channel identifier field 35a.

The PHS slots are communicated intermediate stations 12, 14 via wireless signals. Base station 14 and personal stations 12 respectively include a base station transceiver and personal station transceiver individually configured to provide radio frequency (RF) wireless signal communications between the respective stations 12, 14. Stations 12, 14 are individually configured to transmit and receive wireless signals. For uplink and downlink communications, a carrier signal is modulated by a baseband signal which contains control and data information to be communicated. The baseband signal includes the control and data information in accordance with the PHS protocol slot format.

Figure 5:
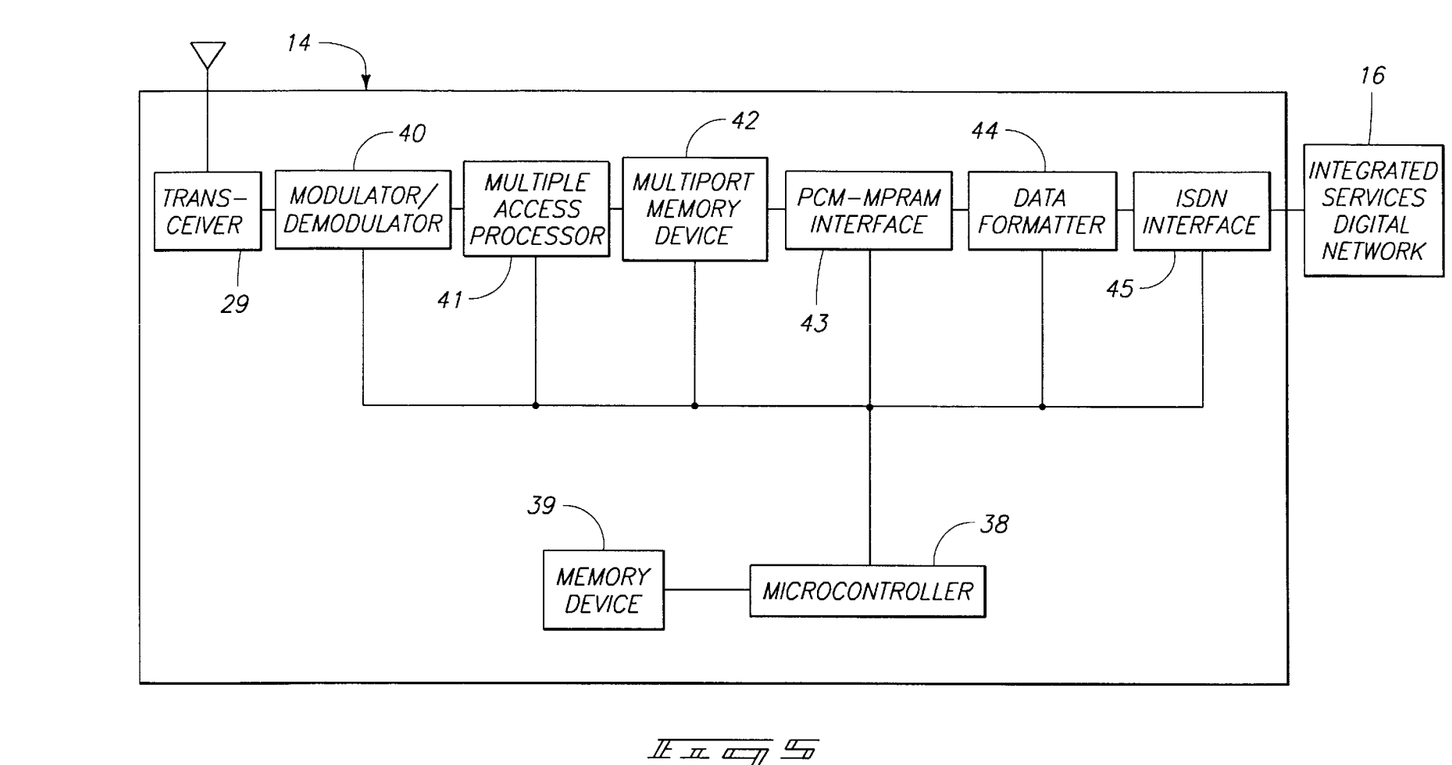
FIG. 5 is a functional block diagram of one embodiment of a base station of a PHS communications system.

Referring to FIG. 5, the illustrated embodiment of base station 14 includes a transceiver 29, modulator/demodulator 40, multiple access processor 41, multiport memory (MPRAM) device 42, PCM-MPRAM interface 43, data formatter 44, ISDN interface 45, microcontroller 38 and memory device 39. Transceiver 29 comprises an RF/IF transceiver in one embodiment. The illustrated transceiver 29 is coupled with an antenna for providing radio frequency communications with one or more personal stations 12. ISDN interface 45 is coupled with an Integrated Services Digital Network 16.

In the described embodiment, microcontroller 38 of base station 14 is coupled with components 40–45. Microcontroller 38 is configured via software to control operations of the components of base station 14. Software code may be stored in internal memory device 39 coupled with microcontroller 38.

Transceiver 29 is configured to provide radio frequency communication operations in the described embodiment. In particular, transceiver 29 is configured to receive modulated carrier signals transmitted from corresponding personal stations 12. In addition, transceiver 29 is operable to output modulated carrier signals to appropriate personal stations 12.

Transceiver 29 is electrically coupled with modulator/demodulator 40 in the illustrated embodiment. The described modulator/demodulator 40 comprises a $\pi/4$ DQPSK modem. Modulator/demodulator 40 is configured to extract baseband signals from the received carrier signals. The baseband signals contain PHS slots formed and transmitted by the personal stations 12. In addition, modulator/demodulator 40 is operable to modulate the carrier signal to be transmitted. Modulator/demodulator 40 is configured to modulate the carrier signal corresponding to PHS slots to be transmitted.

Modulator/demodulator 40 is electrically coupled with multiple access processor 41. Processor 41 provides sharing of communications of multiple personal stations 12 with a single base station 14. In one embodiment, multiple access processor 41 comprises a TDMA core configured to implement time division multiple access (TDMA) and time division duplexing (TDD) operations according to the PHS standard.

Time division duplexing provides bi-directional communications within base station 14. As referred to herein, receive communications are designated as those passing from a portable or personal station 12 through base station 14 to the Integrated Services Digital Network 16. Additionally, transmit communications are those which are received within base station 14 from the Integrated Services Digital Network 16, processed by base station 14 and transmitted to a selected one or ones of personal stations 12.

During receive communications, multiple access processor 41 extracts transmitted data from the received PHS slots. The extracted data is applied to multiport memory device 42 for temporary storage. The extracted data is communicated by multiple access processor 41 at a first information transfer rate. First information transfer rate is 16 kbps for half rate communications and 32 kbps for full rate communications in the described embodiment. The received data is thereafter combined to form ISDN B channel slots as described below. ISDN B channel slots are also referred to as second slots.

During transmit communications, multiple access processor retrieves data to be transmitted from multiport memory device 42. Thereafter, multiple access processor 41 inserts the retrieved data into PHS slots according to the PHS communication protocol. The PHS slots to be transmitted are thereafter outputted to modulator/demodulator 40 and transceiver 29 for communication to corresponding personal stations 12.

Multiport memory device 42 may be accessed by multiple access processor 41 and PCM-MPRAM interface 43. During receive communications, extracted data from the PHS slots is inputted into multiport memory device 42. During transmit communications, data received from the Integrated Services Digital Network is stored within multiport memory device 42.

PCM-MPRAM interface 43 is operable to read received data from memory device 42 as well as write data to be transmitted to memory device 42. PCM-MPRAM interface 43 is further configured to provide adaptive differential pulse code modulation (ADPCM) and $\mu$-Law pulse code modulation ($\mu$-Law PCM) operations in the described embodiment. During receive communications, ADPCM data is converted to $\mu$-Law PCM data in compliance with PHS communication protocol. During PHS transmit communications, $\mu$-Law PCM data is converted to ADPCM data.

Data formatter 44 is configured to transfer data in the receive and transmit paths. As discussed below, data formatter 44 is operable to combine data from plural first or PHS slots to form a second or B channel slot for receive path communications. Data formatter 44 is configured to form plural B channel slots and output the B channel slots to ISDN interface 45 at a second information transfer rate of 64 kbps in the described embodiment. Other data rates may be utilized.

For transmit path communications, data formatter 44 is configured in one embodiment to receive B channel slots from ISDN interface 45. Data formatter 44 is configured to separate data of a received B channel slot into a plurality of data portions. Data formatter 44 applies the separated data portions to multiport memory device 42 via PCM-MPRAM interface 43. The separated data portions may be provided within PHS slots by multiple access processor 41 for transmission to personal stations 12. Processor 41 is configured to provide a single data portion into a PHS slot for communication to a corresponding personal station 12.

ISDN interface 45 is provided intermediate data formatter 44 and the external communication network, shown as Integrated Services Digital Network 16 in FIG. 5. ISDN interface 45 communicates in parallel with data formatter 44 and in serial with ISDN network 16. ISDN interface 45 is configured to receive plural control signals (i.e., clock, strobe) from a controller within ISDN network 16.

Figure 6:
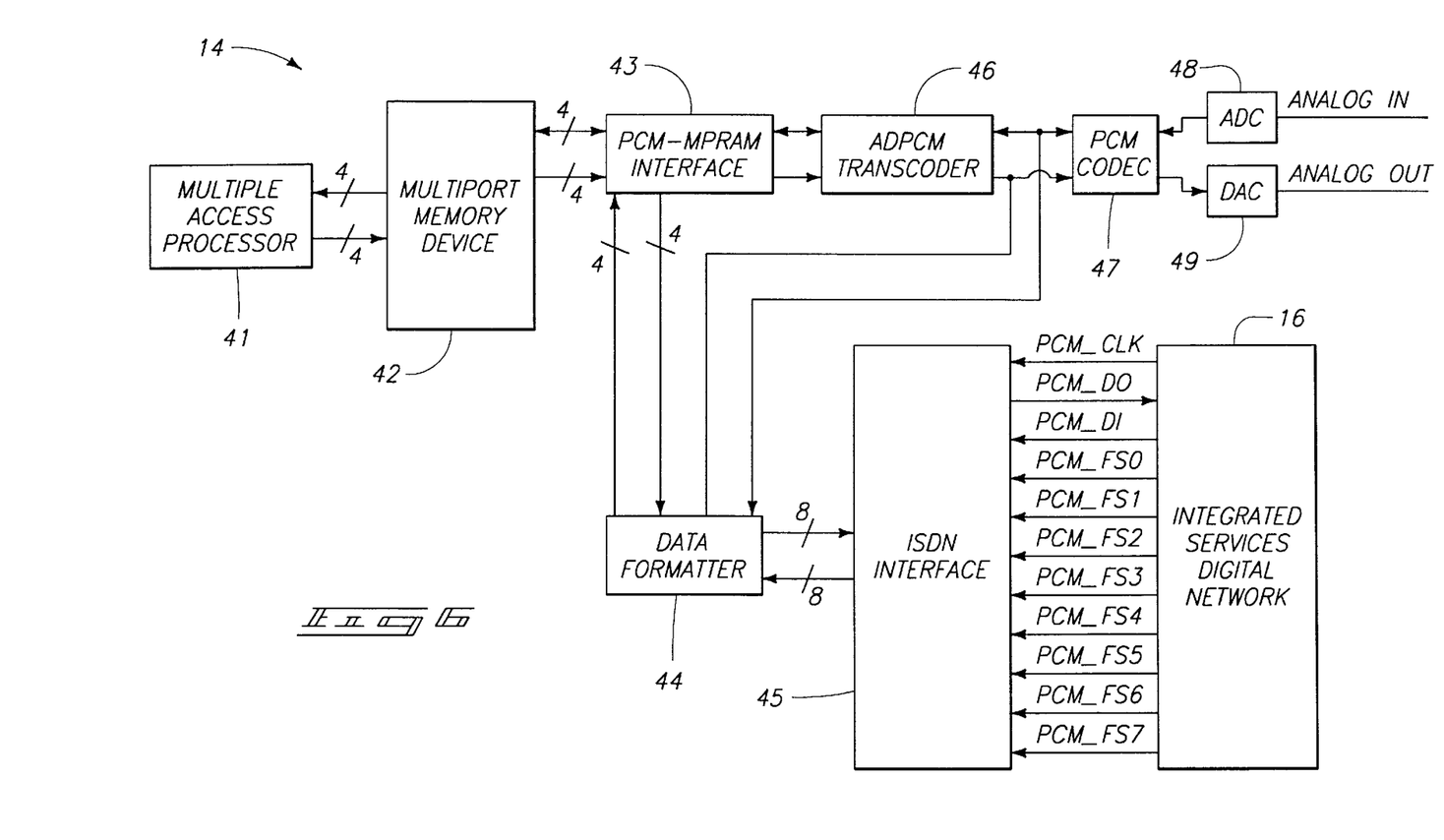
FIG. 6 is a functional block diagram illustrating data paths of the base station and Integrated Services Digital Network.

Referring to FIG. 6, PCM-MPRAM interface 43 is coupled with an analog input and analog output via ADPCM transcoder 46 and PCM CODEC 47. Analog signals generated via an analog device, such as an external microphone, are applied to analog to digital (ADC) converter 48. PCM CODEC 47 provides $\mu$-Law pulse code modulation of the digitized analog signals. The $\mu$-Law PCM signals are applied to ADPCM transcoder 46 which converts the PCM data to ADPCM data for application to PCM-MPRAM interface 43. PCM CODEC 47 provides pulse code modulation or demodulation of voice frequencies according to ITU-T Recommendation G.711 in one embodiment. ADPCM transcoder 46 provides encoding or decoding according to ITU-T Recommendation G.726 in the described embodiment.

ADPCM data to be outputted is received within ADPCM transcoder 46 from PCM-MPRAM interface 43. ADPCM transcoder 46 also operates to convert the ADPCM data into $\mu$-Law PCM data. PCM CODEC 47 is configured to demodulate the $\mu$-Law PCM data and apply the demodulated data to a digital to analog (DAC) converter 49. Analog to digital converter 49 is configured to output analog signals to an analog device, such as an external speaker.

During conventional receive communication operations (i.e., data received from a personal station to be applied to the communications network), data is converted from the PHS standard full or half data rate to the ISDN standard data rate. At full rate, the PHS data rate is 32 kbps. For half rate, the PHS data rate is 16 kbps. One B channel of the Integrated Service Digital Network has a bit rate of 64 kbps.

Such conventional conversions include converting nonrestricted full rate PHS data to 64 kbps ISDN B channel data by adding four dummy bits to four PHS data bits to create a B channel slot. Alternatively, nonrestricted half rate PHS data is converted to 64 kbps ISDN B channel data by adding six dummy bits to two PHS data bits to create a B channel slot.

Figure 7:
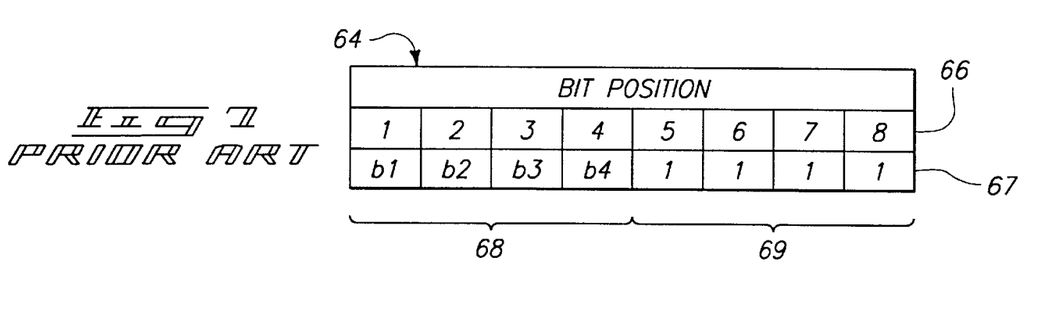
FIG. 7 is a diagrammatic representation of a prior art B channel slot for ISDN communications.

Referring to FIG. 7, a prior art B channel slot 64 is shown. The illustrated B channel slot 64 comprises a first portion 68 and second portion 69. Portions 68, 69 comprise a plurality of bits 67 corresponding to respective bit positions 66. Full rate PHS data from one personal station is provided into first portion 68. To provide interfacing of PHS to ISDN, four dummy "1" bits are provided in second portion 69. The B channel slot containing dummy bits is subsequently applied to the Integrated Services Digital Network 16 for communication at a rate of 64 kbps.

B channel slots containing dummy bits are also provided via Integrated Services Digital Network 16 to a conventional base station. The data to be transmitted to the personal stations is extracted or separated from the dummy bits. The dummy bits are subsequently disregarded.

The present invention provides combined mode data manipulation operations wherein data from plural PHS slots is transmitted within a single B channel slot. The data provided within the B channel slot may be provided from a single personal station or multiple personal stations.

Figure 8A:
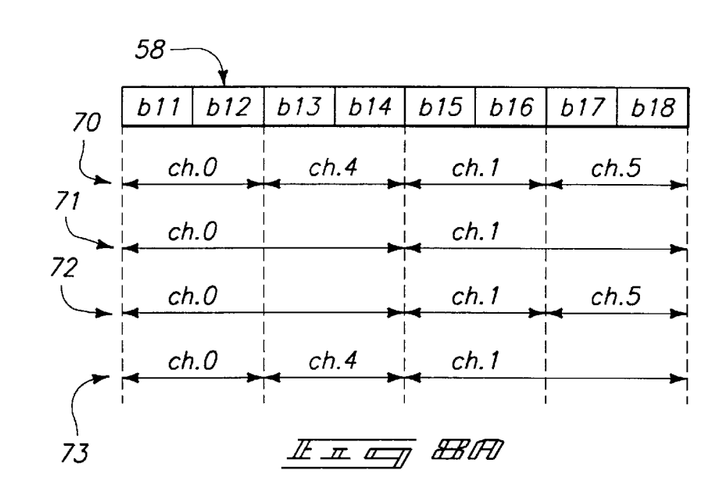
FIGS. 8a and 8b illustrate first and second B channel slots according to various data maps in accordance with the present invention.
Figure 8B:
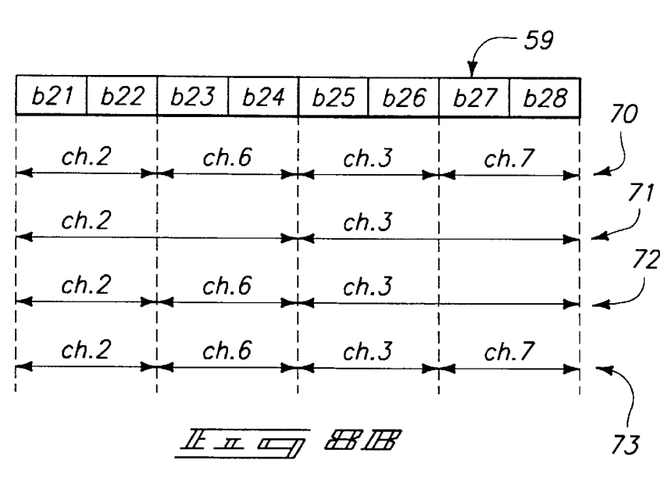

Referring to FIGS. 8a and 8b, plural data maps illustrating the provision of PHS data into a B channel slot format are shown. Two B channel slots 58, 59 are shown corresponding to two B channels of Integrated Services Digital Network 16. A first B channel slot 58 corresponds to a first B channel b1 of the Integrated Services Digital Network 16. A second B channel slot 59 corresponds to a second B channel b2 of the Integrated Services Digital Network 16. Individual B channel slots 58, 59 individually comprise eight data bits. First B channel slot 58 comprises bits b11–b18 and second B channel slot 59 comprises bits b21–b28.

Combining of PHS data may be varied as shown by the illustrated lines 70–73 corresponding to different data maps. Line 70 corresponds to half rate PHS data, line 71 corresponds to full rate PHS data and lines 72–73 correspond to mixed full and half rate PHS data.

Lines 70–73 illustrate data contained within the individual B channel slots 58, 59 during combined mode communication operations in accordance with the present invention. First line 70 represents half rate communications. First B channel slot 58 contains data from channel 0, channel 4, channel 1, and channel 5 of corresponding personal stations 12 during half rate communications. As shown by line 70, second B channel slot 59 comprises data from channel 2, channel 6, channel 3, and channel 7 of corresponding personal stations 12. Line 71 illustrates data transmissions at the full rate of 32 kbps. In particular, first B channel slot 58 comprises data from channel 0 and channel 1. Second B channel slot 59 comprises data from channel 2 and channel 3.

Both full and half rate data communications may be provided within single B channel slots 58, 59. As shown by line 72, first B channel slot 58 comprises full rate data from channel 0 and half rate data from channel 1 and channel 5. Second B channel slot comprises, as shown by line 72, half rate data from channel 2 and channel 6 and full rate data from channel 3. In addition, one B channel slot may comprise mixed full rate and half rate data while the other corresponding B channel slot comprises only half rate or only full rate data. As shown by line 73, first B channel slot 58 comprises half rate data from channel 0 and channel 4 and full rate data corresponding to channel 1. Second B channel slot 59 comprises half rate data from channel 2, channel 6, channel 3, and channel 7 as illustrated by line 73.

In the described embodiment of the invention, microcontroller 38 is configured via software to map the PHS data into B channel slots and separate B channels slots into PHS data for application to respective persona stations 14. Microcontroller 38 is configured via software to provide the mapping of combined mode data in accordance with the present invention for half rate PHS data, full rate PHS data or both as represented by lines 70–73 of the maps illustrated in FIGS. 8a, 8b. Alternatively, other mapping arrangements or configurations may be utilized.

Figure 9:
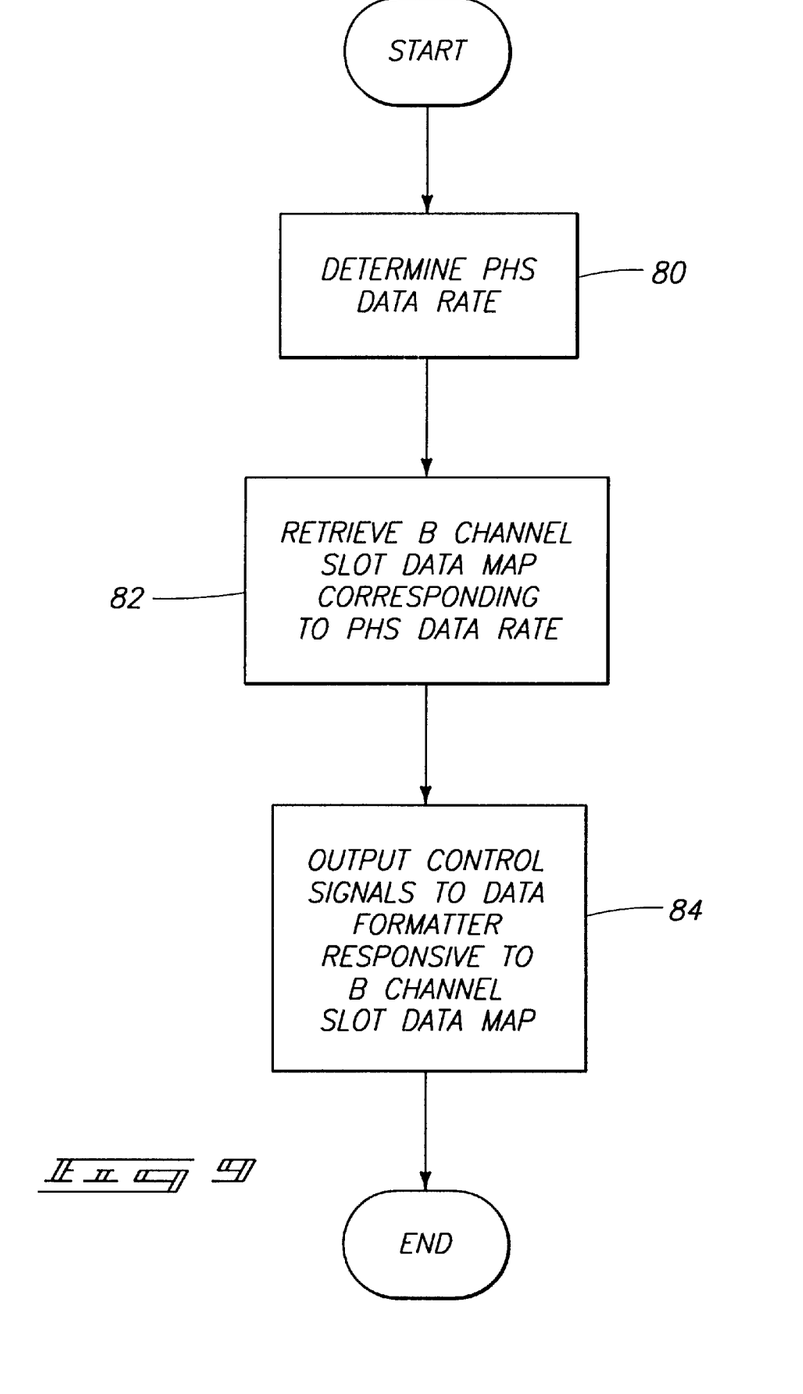
FIG. 9 is a flow chart illustrating data manipulation operations according to one embodiment for providing combined mode data in accordance with the present invention.

Referring to FIG. 9, a flow chart illustrating software in accordance with one embodiment of the invention for implementing combined mode mapping operations is shown. The depicted flow chart may be implemented in hardware within base station 14 in other embodiments of the invention.

Initially, microcontroller 38 is configured at step 80 to determine the PHS data rate of the incoming PHS data. Microcontroller 38 may be configured to identify the data rate from the incoming data itself. Alternatively, microcontroller 38 is configured in conjunction with the associated personal stations 14 to communicate at a predetermined data rate at step 80.

Following the determination of the incoming PHS data rate, microcontroller 38 proceeds to step 82. At step 82, microcontroller 38 retrieves a B channel slot data map which corresponds to the determined PHS data rate from step 80. The data maps, such as those illustrated in FIGS. 8a, 8b, may be stored within memory device 39 also utilized to store the software in one embodiment of the invention.

As previously mentioned, microcontroller 38 is coupled with data formatter 44. Data formatter 44 is operable to implement the combined mode data operations according to the present invention responsive to control signals from microcontroller 38. Following the retrieving of the data map at step 82, microcontroller 38 proceeds to step 84. Microcontroller 38 outputs control signals at step 84 to data formatter 44 responsive to the retrieved B channel slot data map. The assertion of the control signals corresponds to the retrieved data map. Accordingly, the asserted control signals may vary depending upon the PHS data rate and the number of personal stations 14 communicating with base station 12.

Figure 10:
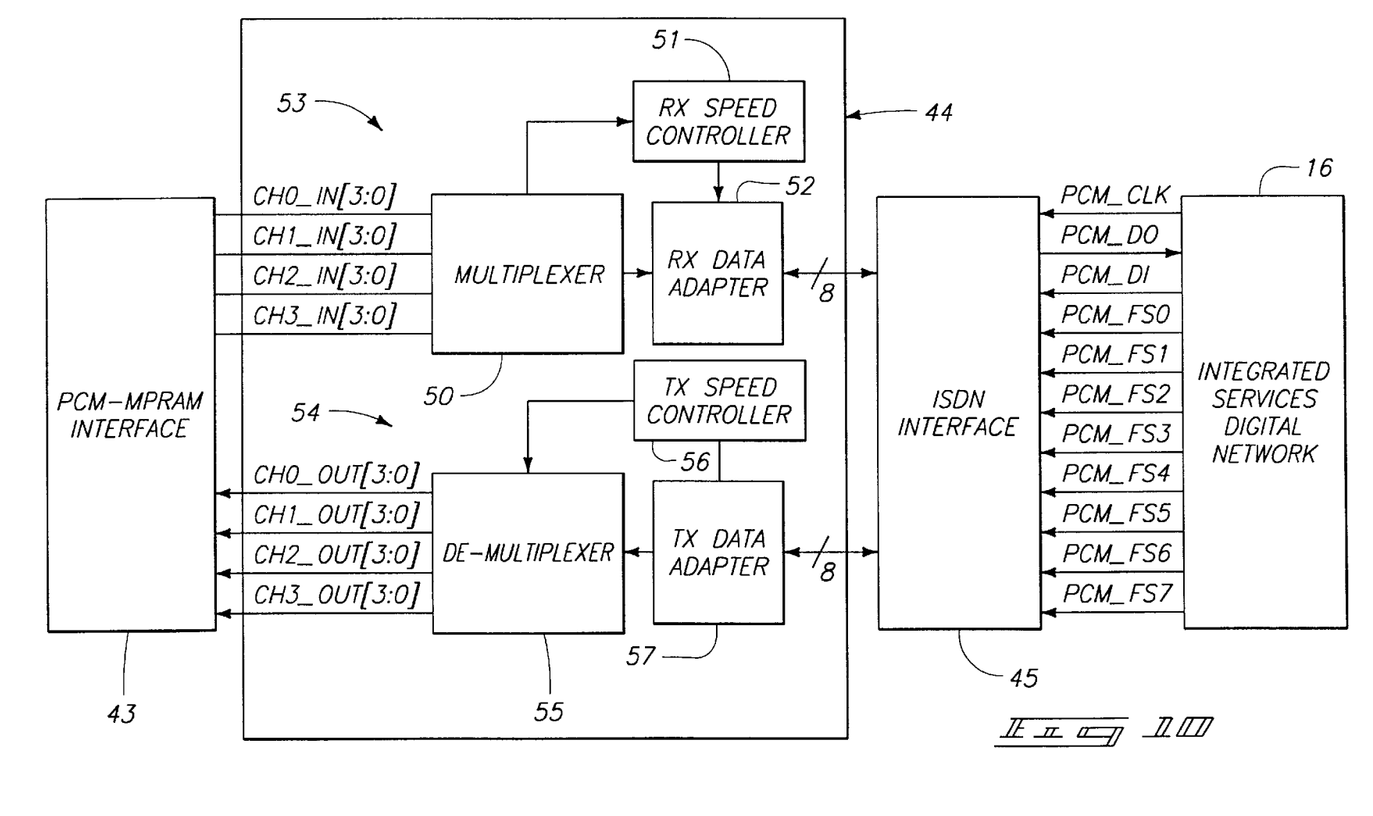
FIG. 10 is a functional block diagram illustrating one embodiment of a data formatter of the base station.

Referring to FIG. 10, one embodiment of data formatter 44 is illustrated. Data formatter 44 is configured to provide combined mode data manipulation operations according to the present invention. During receive communication operations, data received within plural PHS slots is combined to form a single B channel slot for communications via the Integrated Services Digital Network 16. During transmit communication operations, data formatter 44 is configured to separate data received within a single B channel slot from Integrated Services Digital Network 16. The separated data received within the B channel slot is provided within plural PHS slots for transmission to corresponding personal stations 12.

The illustrated data formatter 44 includes a receive path 53 and a transmit path 54. Individual communication paths 53, 54 are provided intermediate PCM-MPRAM interface 43 and ISDN interface 45. Receive path 53 for implementing combined mode data operations in accordance with the present invention comprises a multiplexer 50 and receive data adapter 52. Transmit path 54 for implementing combined mode data operations comprises a de-multiplexer 55 and transmit data adapter 57. Microcontroller 38 is operable to apply control signals to multiplexer 50, receive data adapter 52, de-multiplexer 55, and transmit data adapter 57 to implement the combined mode data manipulation operations. The illustrated data formatter 44 additionally includes a receive speed controller 51 and transmit speed controller 56. Receive speed controller 51 and transmit speed controller 56 are respectively utilized to add and remove dummy bits in accordance with the prior art mode of operation for interfacing intermediate PHS and ISDN. As such, receive speed controller 51 and transmit speed controller 56 are typically not utilized for combined mode data operations according to the present invention. It is preferred, although not necessary, to provide receive speed controller 51 and transmit speed controller 56 within data formatter 44. Provision of controllers 51, 56 enables selective operation of data formatter 44 in either the prior art mode of operation or the combined mode of operation.

In the described embodiment, multiplexer 50 is operable to selectively couple the incoming channels (CH0–CH3) to receive data adapter 52 responsive to control signals from microcontroller 38. Incoming channels CH0–CH3 individually correspond to respective personal stations 12 communicating with base station 14. The incoming channels are coupled with receive data adapter 52 via multiplexer 50 according to the data map being utilized. Receive data adapter 52 is configured to latch the received PHS data for subsequent outputting to ISDN interface 45 in B channel slot format. Receive data adapter 52 is configured as a first in, first out (FIFO) in the described embodiment. The data is arranged in an eight bit B channel slot according to the appropriate data map being utilized.

ISDN interface 45 provides bi-directional interfacing between data formatter 44 and Integrated Services Digital Network 16. ISDN interface 45 communicates via dual parallel 8-bit connections with data formatter 44 in the illustrated embodiment. ISDN interface 45 communicates via serial communications PCM_D0 (output or receive) and PCM_DI (input or transmit) with Integrated Services Digital Network 16.

Serial output data line PCM_D0 is output from ISDN interface 45 to the Integrated Services Digital Network 16. Output data line PCM_D0 provides a receive path intermediate base station 14 and network 16. The serial input data line PCM_DI is provided for transmit operations and applies data from the Integrated Services Digital Networks 16 to ISDN interface 45. Input data line PCM_DI provides a transmit path intermediate network 16 and base station 14.

Data received from the Integrated Services Digital Network 16 passes through the transmit path 54 of the base station 14 coupled with ISDN interface 45. The input data is applied to transmit data adapter 57. In combination with de-multiplexer 55, transmit data adapter 57 is operable to provide combined mode interface data operations in accordance with the present invention. In particular, transmit data adapter 57 stores the received B channel slot. De-multiplexer 55 and transmit data adapter 57 convert the incoming 64 kbps IDSN data to PHS data (16 or 32 kbps data corresponding to full rate or half rate communications).

De-multiplexer 55 and transmit data adapter 57 are configured via microcontroller 38 to remove or separate the data within the incoming B channel slots. Data within the B channel slots is separated into an appropriate format in accordance with the PHS communications protocol for transmission to respective personal stations 12. Transmit data adapter 57 latches or stores the incoming B channel slots. Transmit data adapter 57 is implemented as a first in, first out (FIFO) device in one embodiment. Microcontroller 38 outputs control signals according to the appropriate data map to de-multiplexer 55 for selectively coupling transmit data adapter 57 with channels CH0–CH3 corresponding to respective personal stations 12.

Selective coupling of channels CH0–CH3 with transmit data adapter 57, as specified by the data map being utilized, separates the data from the received B channel slot into the appropriate PHS slots. Channels CH0–CH3 apply the data along the transmit data path to PCM-MPRAM interface 43. The incoming data is thereafter applied to the multiport memory device 42. Multiple access processor 41 may thereafter retrieve the incoming data from multiport memory device 42 and provide the incoming data into the appropriate format for transmission to the corresponding personal stations 12 in accordance with the PHS communications protocol.

Integrated Services Digital Network 16 controls the timing of data transfer operations intermediate ISDN interface 45 and network 16. ISDN interface 45 receives timing information and strobe signal information utilized to control data transfer operations from a controller of Integrated Services Digital Network 16. More specifically, Integrated Services Digital Network 16 applies timing signals, including a clock signal and strobe signals, to ISDN interface 45. The ISDN controller applies a clock signal PCM_CLK to ISDN interface 45 to establish a common timing reference. Further, plural strobe signals PCM_FS0–PCM_FS7 are generated by the ISDN controller and applied to ISDN interface 45.

The strobe signals control the timing of data flow intermediate ISDN interface 45 and Integrated Services Digital Network 16. Individual strobe signals control the data flow corresponding to individual B channels of the Integrated Services Digital Network 16. For example, two strobe signals PCM_FS0 and PCM_FS1 are utilized to implement combined mode operations in accordance with the present invention. Accordingly, two strobe signals PCM_FS0 and PCM_FS1 may be utilized to transfer data intermediate eight PHS personal stations and the ISDN network. In conventional configurations, eight strobe signals PCM_FS0–PCM_FS7 are required to control data transfer operations intermediate eight PHS personal stations and the ISDN network. The assertion of a strobe signal transfers data intermediate interface 45 and network 16 as discussed below.

Figure 11:
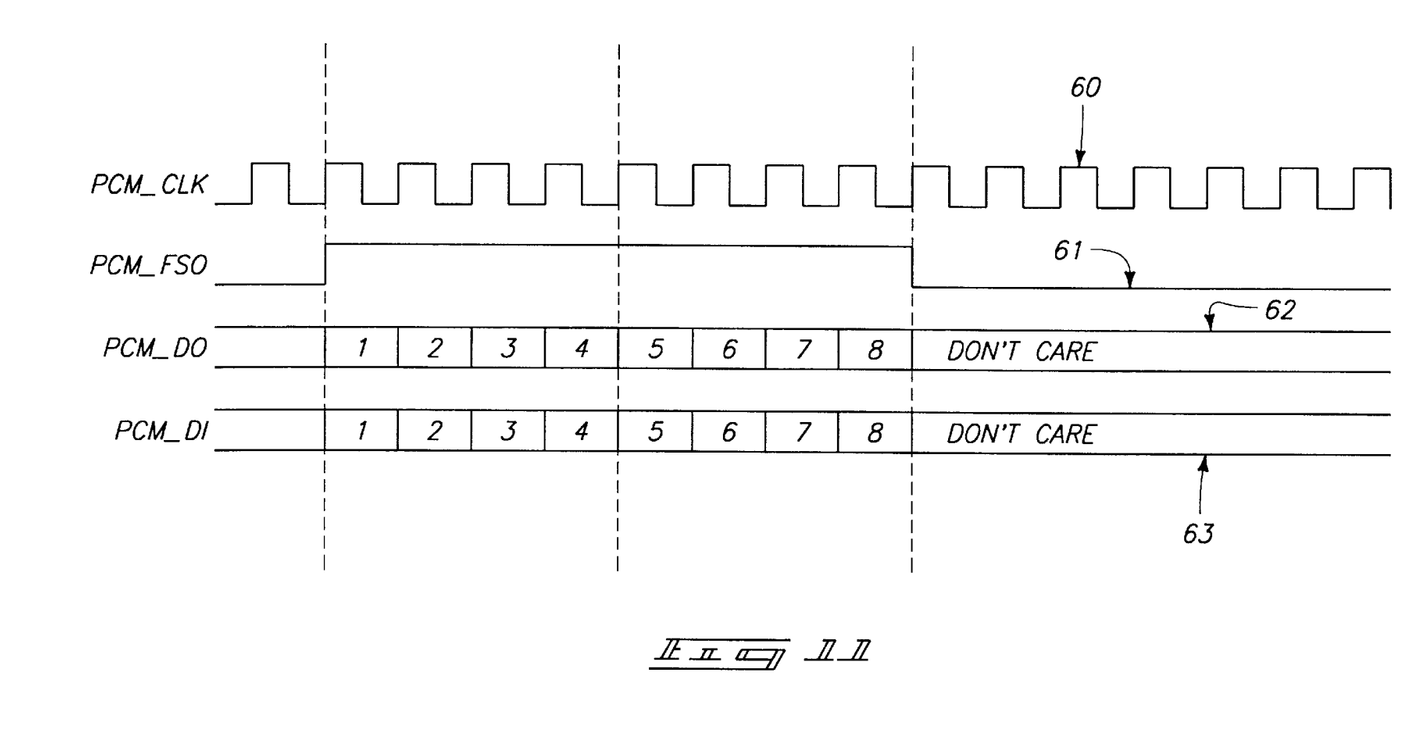
FIG. 11 is a timing diagram of interfacing between the base station and the ISDN network.

Referring to FIG. 11, controlled data flow in accordance with one embodiment of the invention is shown with respect to the illustrated timing diagram. Line 60 represents the PCM_CLK clock signal applied from the Integrated Services Digital Network 16 to the ISDN interface 45. Clock signal PCM_CLK has a frequency of 64 kHz in one embodiment of the invention. Strobe signals PCM_FS0–PCM_FS7 (strobe signal PCM_FS0 is shown in FIG. 11) are 8 kHz signals in the described embodiment of the invention.

Line 61 represents first strobe signal PCM_FS0. Line 62 represents serial output PHS data from ISDN interface 45 of base station 14 to the Integrated Services Digital Network 16 via output line PCM_D0. Line 63 represents serial input data from the Integrated Services Digital Network 16 to the ISDN interface 45 via input line PCM_DI.

Following the assertion of the PCM_FS0 strobe signal, eight PHS data bits arranged in a single B channel slot according to the selected data map are output from ISDN interface 45 to Integrated Services Digital Network 16 via output data line PCM_D0. In addition, eight ISDN data bits arranged in a single B channel slot are input via data line PCM_DI from the Integrated Services Digital Network 16 to ISDN interface 45 responsive to the assertion of strobe signal PCM_FS0.

The assertion of an individual strobe signal results in the bi-directional transfer of eight data bits (eight bits output via PCM-D0 and eight bits input via PCM-DI). Bi-directional transfer of eight bits provides input and output data rates of 64 kbps intermediate base station 14 and ISDN 16. Assertion of first strobe signal PCM_FS0 provides bidirectional communication via the first B channel of ISDN network 16. As shown in FIG. 11, the first B channel receives an eight bit B channel slot and outputs an eight bit B channel slot responsive to the assertion of first strobe signal PCM_FS0.

In prior art modes of operation described above, eight strobe signals PCM_FS0–PCM_FS7 are utilized to control the transfer of data inasmuch as eight B channels of the ISDN are required for half rate communications. In combined mode data transfer operations in accordance with the present invention, PCM_FS0 and PCM_FS1 strobe signals are utilized to control the data transfer operations inasmuch as two B channels are necessary for half rate communications with eight PHS personal stations 12. Combined mode operations according to the present invention utilize less Integrated Services Digital Network resources and control circuitry compared with prior art modes of operation.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A data communication device comprising:
   a transceiver operable to receive wireless signals and recover a baseband signal containing a plurality of first slots from the received wireless signals, the first slots carrying data in a first format;
   a multiple access processor coupled with the transceiver, the multiple access processor being operable to extract data from the first slots and communicate first extracted data at a first information transfer rate and second extracted data at a second information transfer rate different than the first information transfer rate;
   a data formatter operable to combine the first and second extracted data from the first information transfer rate and the second information transfer rate from plural first slots to form a second slot, the data formatter further being operable to output the second slot at a third information transfer rate different than the first and second information transfer rates; and an interface coupled with the data formatter, the interface being configured for connection with a network and operable to communicate data in the second slot using a second format that is different from the first format.

2. The data communication device according to claim 1 wherein the data communication device comprises a personal handy-phone system base station.

3. The data communication device according to claim 1 wherein the first slots comprise PHS slots and the second slot comprises an ISDN B channel slot.

4. The data communication device according to claim 1 wherein the data formatter is operable to form a plurality of second slots.

5. The data communication device according to claim 1 wherein the multiple access processor comprises a time division multiple access processor.

6. The data communication device according to claim 1 wherein the second information transfer rate is one of twice and four times the first information transfer rate.

7. The data communication device according to claim 1 wherein the network comprises an Integrated Services Digital Network.

8. The data communication device according to claim 1 further comprising a multiport memory device intermediate the multiple access processor and the data formatter, the multiport memory device being configured to store the data.

9. The data communication device according to claim 1 wherein the data formatter is operable to form the second slot using data from two PHS slots.

10. The data communication device according to claim 1 wherein the data formatter is operable to form the second slot using data from four PHS slots.

11. The data communication device according to claim 1 wherein the data formatter is configured to receive an ISDN B channel slot and separate data within the received ISDN B channel slot into a plurality of data portions, the time division multiple access processor is configured to provide individual ones of the data portions into respective PHS slots.

12. The device according to claim 1 further comprising a microcontroller configured to control the data formatter to combine the data from plural first slots to form the second slot according to a data map.

13. A method of communicating data comprising:
forming a plurality of first slots containing data to be communicated, the first slots carrying data in a first format;
communicating the first slots including transmitting wireless signals and receiving the wireless signals;
extracting the data from the wireless signals at a first information transfer rate and a second information transfer rate different than the first information transfer rate following the receiving;
combining data extracted at the first information transfer rate and the second information transfer rate from plural first slots;
forming a second slot using the combined data extracted at the first information transfer rate and the second information transfer rate; and
outputting the second slot at a third information transfer rate different than the first and second information transfer rates, the second slot carrying data using a format that is different than the first format.

14. The method according to claim 13 further comprising forming and outputting a plurality of second slots.

15. The method according to claim 13 wherein the transmitting comprises transmitting using plural personal handy-phone system personal stations.

16. The method according to claim 13 wherein the receiving comprises receiving using a personal handy-phone system base station.

17. The method according to claim 13 wherein the forming a plurality of first slots comprises forming a plurality of personal handy-phone system slots.

18. The method according to claim 13 wherein the communicating the second slot comprises outputting an ISDN B channel slot to an Integrated Services Digital Network.

19. The method according to claim 13 wherein the second information transfer rate is greater than the first information transfer rate.

20. The method according to claim 13 wherein the second information transfer rate is one of twice and four times the first information transfer rate.

21. The method according to claim 13 further comprising:
receiving a second slot containing data;
separating data contained with the received second slot;
providing a first portion of the separated data in one first slot; and
providing a second portion of the separated data in another first slot.

22. The method according to claim 13 further comprising outputting the one first slot and another first slot to respective personal handy-phone system personal stations.

23. The method according to claim 13 further comprising detecting the first information transfer rate and the second information transfer rate, accessing one of a plurality of data maps responsive to the detecting, and wherein the combining and the forming comprise combining and forming according to the accessed data map.

24. A method of communicating data comprising:
communicating data through a receive path including:
receiving data over at least one wireless communication path at a first information transfer rate and a second information transfer rate different than the first information transfer rate;
combining the data received at the first and the second information transfer rates; and
outputting the combined data at a third information transfer rate different than the first and second information transfer rates; and
communicating data through a transmit path including:
receiving data at the third information transfer rate using a first data-slot format;
separating the data received at the third information transfer rate; and
outputting the separated data at the first information transfer rate and the second information transfer rate using a second data-slot format that is different than the first data-slot format.

25. The method according to claim 24 wherein the communicating data within the receive path comprises receiving data within plural PHS slots and outputting combined data within an ISDN B channel slot, and the communicating data within the transmit path comprises receiving data within an ISDN B channel slot and outputting data within plural PHS slots.

26. The method according to claim 25 further comprising outputting plural ISDN B channel slots and receiving plural ISDN B channel slots.

27. The method according to claim 24 wherein the receiving and outputting at the first information transfer rate and the second information transfer rate comprise communicating with a plurality of personal handy-phone system personal stations.

28. The method according to claim 24 wherein the communicatings individually comprise communicating data within a personal handy-phone system base station.

29. The method according to claim 24 wherein the receiving and outputting at the third information transfer rate comprise communicating with an Integrated Service Digital Network.

30. The method according to claim 24 wherein the third information transfer rate is greater than the first information transfer rate and the second information transfer rate.

31. The method according to claim 24 wherein the third information transfer rate is one of twice and four times the first information transfer rate.

32. The method according to claim 24 further comprising detecting the first information transfer rate and the second information transfer rate, accessing one of a plurality of data maps responsive to the detecting, and wherein the combining comprises combining the data into a slot according to the accessed data map.

33. A method of communicating data comprising:
providing data in a plurality of first slots;
communicating the first slots over a wireless communication channel;
extracting data from the first slots;
accessing one of a plurality of data maps responsive to at least one data transfer rate of the first slots;
combining data extracted from the first slots according to the data map;
forming a second slot using combined data from the first slots; and
communicating the second slot.

34. The method according to claim 33 further comprising communicating a plurality of second slots.

35. The method according to claim 33 wherein providing data in the first slots comprises providing data in a plurality of personal handy-phone system slots.

36. The method according to claim 33 wherein the extracting comprises extracting data using a personal handy-phone system base station.

37. The method according to claim 33 wherein the communicating the second slot comprises communicating the second slot via an Integrated Services Digital Network.

38. The method according to claim 33 further comprising:
receiving a second slot;
separating data contained within the received second slot into a plurality of data portions;
providing the data portions into respective ones of a plurality of first slots; and
communicating the first slots containing the data portions.

39. The method according to claim 33 wherein the communicating the second slots comprises communicating the second slots at an information transfer rate which is greater than an information transfer rate of the communicating of the first slots.

40. The method according to claim 33 wherein the combining comprises combining data from two PHS slots.

41. The method according to claim 33 wherein the combining comprises combining data from four PHS slots.

42. The method according to claim 33 wherein the extracting data comprises extracting data having a plurality of information transfer rates and the forming comprises forming the second slot using the combined data having the plurality of information transfer rates.

43. A personal handy-phone system base station comprising:
a transceiver operable to receive radio frequency signals from plural personal handy-phone system personal stations, the radio frequency signals from respective personal stations containing a plurality of PHS slots individually having data therein, the transceiver further operable to recover baseband signals from the received radio frequency signals, the baseband signals containing the PHS slots;
a time division multiple access processor electrically coupled with the transceiver, the time division multiple access processor being operable to extract data from the PHS slots and output the extracted data at a first information transfer rate of 16 kbps and a second information transfer rate of 32 kbps;
a multiport random access memory device electrically coupled with the time division multiple access processor, the multiport random access memory device being configured to store the extracted data;
a data formatter electrically coupled with the multiport random access memory device, the data formatter being configured to retrieve data from the multiport random access memory device and combine data from plural PHS slots to form an individual ISDN B channel slot comprising data extracted at the first information transfer rate of 16 kbps and the second information transfer rate of 32 kbps, the data formatter being further configured to output the ISDN B channel slots at a third information transfer rate of 64 kbps; and
an interface configured to output the ISDN B channel slots to an Integrated Services Digital Network responsive to timing signals provided from the Integrated Services Digital Network.

44. A data communication device comprising:
a receiver configured to receive a plurality of communication signals over a wireless communication path comprising a plurality of first slots;
circuitry coupled with the receiver and configured to access one of a plurality of data maps corresponding to at least one data rate of the first slots and to formulate a plurality of second slots, wherein the circuitry is configured to provide data from a plurality of the first slots into an appropriate one of the second slots according to the accessed data map; and
an interface coupled with the circuitry and adapted to communicate the second slots externally of the data communication device.

45. The device according to claim 44 wherein the first slots comprise PHS slots.

46. The device according to claim 44 wherein the second slot comprises an ISDN B channel slot.

47. The device according to claim 44 wherein the first slots comprise PHS slots and the second slot comprises an ISDN B channel slot.

48. The device according to claim 44 wherein the receiver is configured to receive the communication signals comprising the first slots having data of a first data rate and data of a second data rate different than the first data rate, and the circuitry is configured to provide the data of the first data rate and the data of the second data rate into one of the second slots according to the accessed data map.

49. The device according to claim 48 wherein the interface is adapted to communicate the second slots at a third data rate different than the first data rate and the second data rate.

50. The device according to claim 48 wherein the circuitry is configured to provide the data of the first data rate comprising full rate data and the data of the second data rate comprising half rate data into the second slots.

51. The device according to claim 44 wherein the circuitry is configured to determine at least one data rate of the first slots and to access the one data map responsive to the determination.

52. A data communication device comprising:

a receiver configured to receive a plurality of communication signals comprising a plurality of first slots;

circuitry coupled with the receiver and configured to extract data at a plurality of data rates from the first slots and to provide the data extracted at the plurality of data rates from the first slots into a single second slot; and an interface coupled with the circuitry and adapted to communicate the second slot externally of the data communication device wherein the first and second slots carry data in different first and second formats, respectively.

53. The device according to claim 52 wherein the first slots comprise PHS slots and the second slot comprises an ISDN B channel slot.

54. The device according to claim 52 wherein the circuitry is configured to access one of a plurality of data maps responsive to the data rates of the first slots and to provide the data into the single second slot according to the accessed data map.

* * * * *